Oct. 31, 1944.     N. H. NELSON     2,361,864
TRACTION WHEEL
Filed Oct. 19, 1942     3 Sheets-Sheet 2
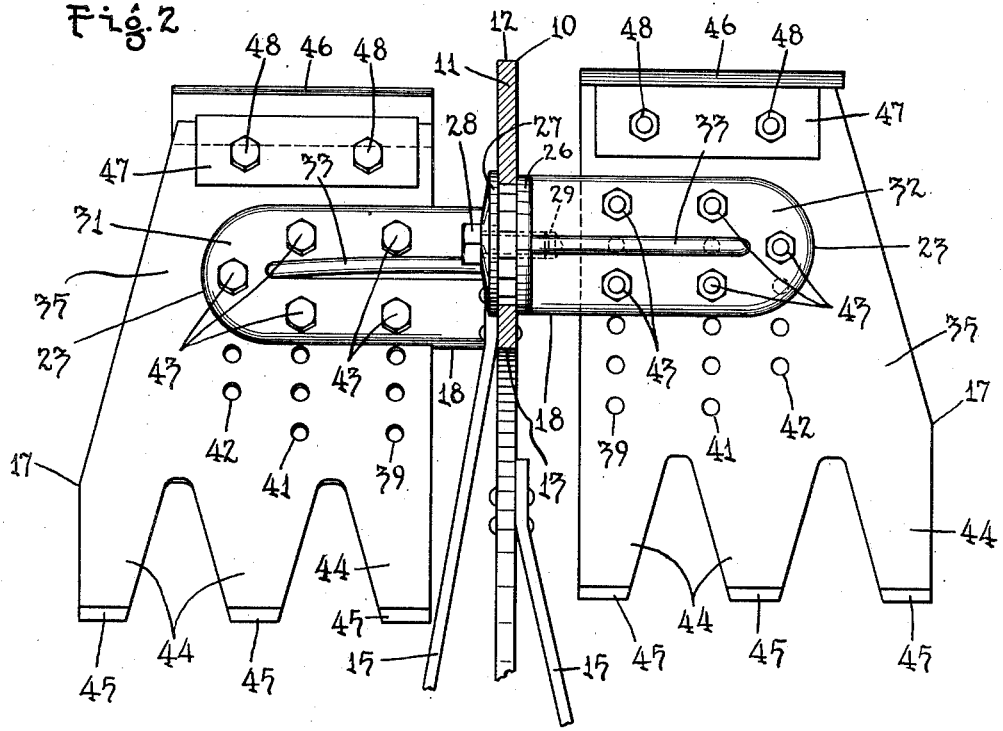

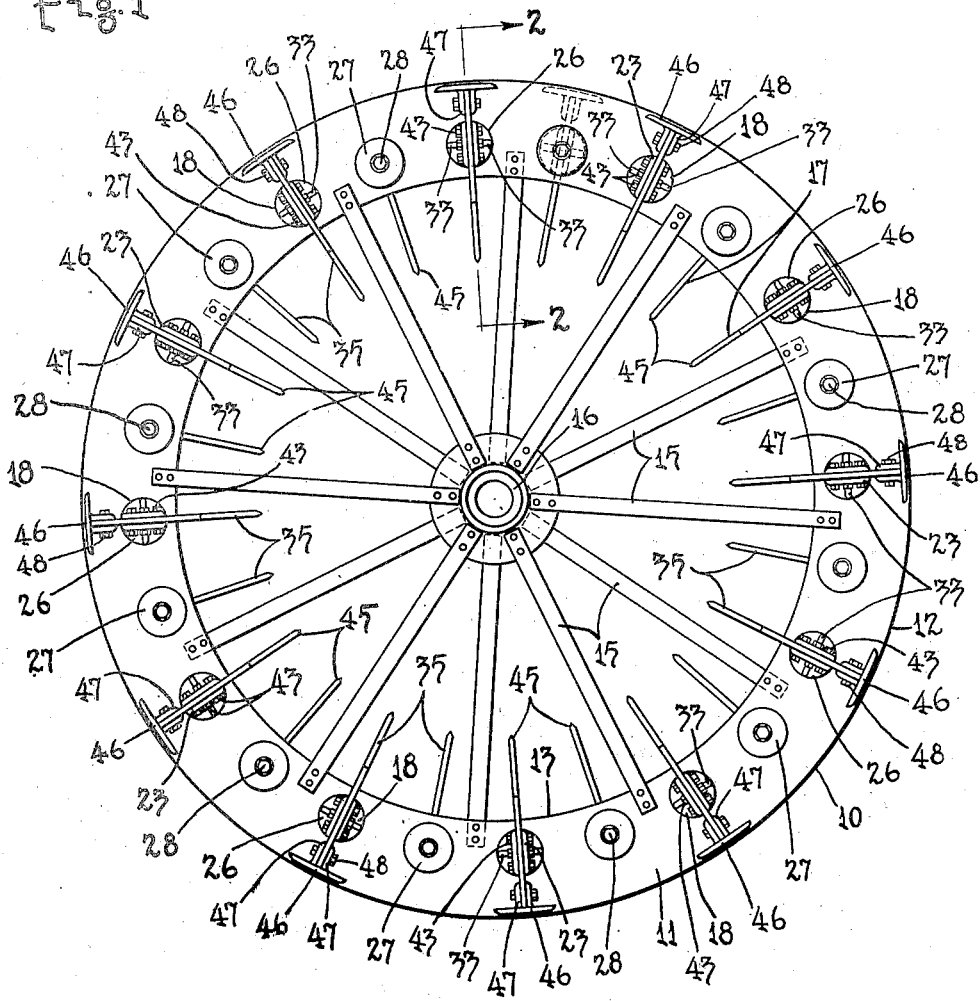

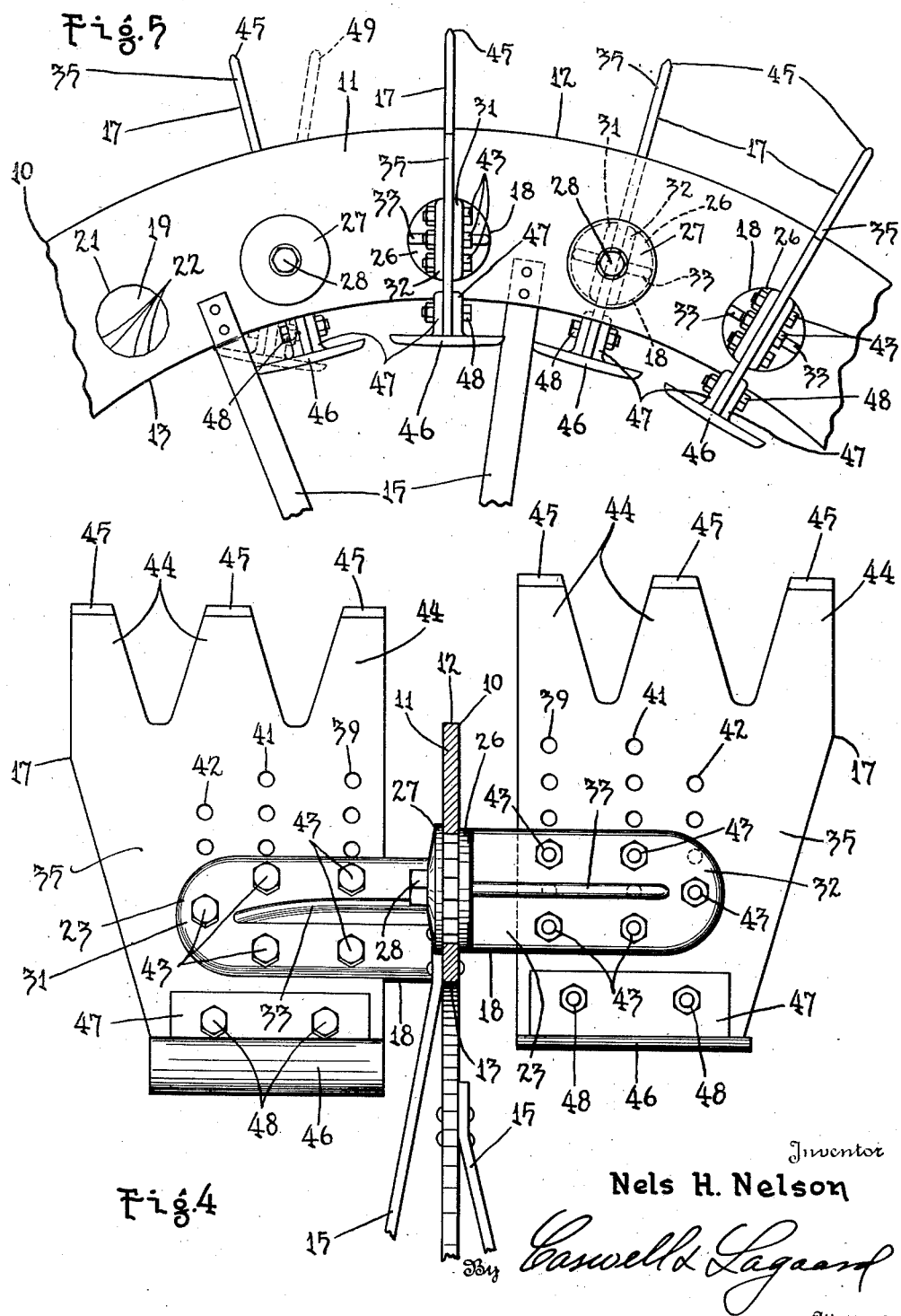

Patented Oct. 31, 1944

2,361,864

UNITED STATES PATENT OFFICE 2,361,864

TRACTION WHEEL

Nels H. Nelson, Minneapolis, Minn.

Application October 19, 1942, Serial No. 462,479

4 Claims. (Cl. 301—44)

My invention relates to traction wheels and particularly to lugs for use in conjunction therewith and has for an object to provide a construction adapted to be used for all ground conditions.

Another object of the invention resides in providing a lug which will assist in cultivating the ground over which the wheel travels.

An object of the invention resides in constructing the wheel with a plate-like rim attached to the hub of the wheel and having a circular edge for use in riding upon pavement or other hard surfaces and in providing a number of lugs adapted to be used in conjunction therewith and adjustable with reference to said rim.

Another object of the invention resides in constructing the rim with a plurality of spaced circumferentially arranged openings, the marginal portion of the rim about each opening having a number of irregularities and in providing a number of lug holders, one for each opening, said lug holders having corresponding irregularities adapted to engage the irregularities of the rim and to be held from rotation thereby.

An object of the invention resides in arranging said irregularities so that each lug holder may be placed in different relative angular positions within its opening by bringing different of the irregularities of the rim into engagement with the irregularities of the lug holder.

Another object of the invention resides in constructing said openings in the form of regular polygons and in similarly constructing the lug holders with heads adapted to fit within the openings.

An object of the invention resides in constructing the lugs with blades having teeth formed thereon and adapted to enter into the ground when the lugs are properly positioned.

A still further object of the invention resides in providing the lugs with shoes adapted to support the wheel on soft ground when the lugs are positioned in the proper manner.

A feature of the invention resides in constructing each lug holder with a pair of spaced arms between which is received the blade of the lug and to which the lug is attached.

Other objects of the invention reside in the novel combination and arrangement of parts and in the details of construction hereinafter illustrated and/or described.

In the drawings:

Fig. 1 is an elevational view of a wheel illustrating an embodiment of my invention.

Fig. 2 is a fragmentary elevational sectional view taken on line 2—2 of Fig. 1 and drawn to a greater scale.

Fig. 3 is a perspective view of one of the lug holders detached from the wheel.

Fig. 4 is a view similar to Fig. 2 showing the lugs reversed.

Fig. 5 is a fragmentary elevational view of the wheel similar to Fig. 1 illustrating the parts arranged as shown in Fig. 4 and drawn to a greater scale than Fig. 1.

With the varying road conditions and conditions of the ground on which traction wheels are used, it becomes highly desirable to provide a single traction wheel and one type of lug which may operate satisfactorily for all road and ground conditions and which may be adjusted both as to angularity and depth of engagement with the ground. The instant invention provides a construction which will meet with all of these requirements.

In the drawings, I have shown a traction wheel indicated in its entirety by the reference numeral 10. This traction wheel comprises a rim 11 which is plate-like in form, being constructed from a sheet of heavy plate metal to provide a circular outermost edge 12 and a corresponding inner edge 13, making the rim in the form of an annulus. The rim 11 has attached to it a number of spokes 15 which are secured to a hub 16. The hub 16 may be of any suitable construction and, not forming any feature, the same has hence not been shown in detail.

For use in conjunction with the rim 11, a number of lugs 17 are employed which are mounted in lug holders 18, one of which is shown in detail in Fig. 3. These parts will now be described in detail.

At the locality where each of the lug holders 18 is attached to the rim 11, the said rim as shown in Fig. 5 is constructed with an opening 19. This opening is in the shape of a regular polygon of any desired number of sides, the instant polygon being shown with sixteen sides. These sides are equally spaced and the angles intercepted therebetween are equal, so that a number of irregularities are formed in the marginal portion 21 of the rim 11 adjacent the opening 19 and which are indicated by the reference numeral 22.

One of the lug holders 18 is shown in Fig. 3 and comprises a body 23 having a head 24 extending outwardly therefrom and at one end. The head 24 is of the same shape as the opening 19 in the rim 11, having a number of equal sides indicated at 25 and forming a regular polygon adapted to be received within the opening 19. These sides form irregularities for engaging the irregularities 22 of the opening 19 and when the head 24 is inserted in said opening, hold the lug from rotation. A flange 26 encircles the head 24 and provides a shoulder 30 adapted to butt against one side of the rim 11 and to hold the head 24 within the opening 19. A washer 27 overlies the rim 11 on the other side and is held in position by means of a cap screw 28 which passes through said washer and screws into a threaded hole 29 in the center of the head 24.

The lug holder 18 is constructed with two spaced plate-like arms 31 and 32 which issue outwardly from the body 23. Ribs 33, connected to said arms and to the head 24 and body 23, stiffen the arms and prevent springing apart of said arms. These arms form a space 34 therebetween in which is received the lug 17.

One of the lugs 17 is shown in Fig. 4 and consists of a blade 35 of a material equal in thickness to the space 34 of lug holder 18, which blade is adapted to be snugly received within said space. The arms 31 and 32 have holes 36, 37 and 38 in the same and the blade 35 has corresponding rows of holes 39, 41 and 42. Bolts 43 are adapted to pass through said holes and to rigidly secure the lug 17 in place. It will be noted that the holes in the rows of holes 39, 41 and 42 are equally spaced so that the lug 17 may be attached to the holder 18 in such a manner that the ends thereof project outwardly from the lug holder varying distances. The blade 35, at one end, has a number of teeth 44 issuing outwardly therefrom which have sharpened edges 45 adapted to readily enter the ground. The other end of the blade 35 has attached to it a shoe 46 which is provided with spaced ears 47 adapted to receive the end of the blade therebetween. Bolts 48 extend through said ears and through the blade 35 and serve to hold the shoes 46, rigidly mounted thereon.

The heads 24 of the lug holders 18 may be positioned within the holes 19 so that the lugs extend from either side of the rim 11. If desired, the said holders may be positioned in different angular relation with respect to the sides of the opening 19, whereby the teeth 44 may extend outwardly as shown in Figs. 4 and 5, or the shoe may extend outwardly, as shown in Figs. 1 and 2. In the latter case, the shoes are caused to lie at the periphery 12 of the rim 10, so as to aid in supporting the wheel on the ground. This relieves the concentration of the load on the surface 12 of the rim and, at the same time, makes it unnecessary for the rim to enter the ground when the wheel travels over soft ground. If desired, the blades 35 may be set at an angle with respect to the radii of the wheel, one such position being shown in dotted lines in Fig. 5 and designated by the reference numeral 49. It can be readily comprehended that this angle can be varied within the limits of the device to meet with the local requirements.

When the lugs are desired for use merely for traction, the blades 35 are adjusted through the individual holes of the rows of holes 39, 41 and 42, so that said blades project a short distance outwardly beyond the periphery 12 of the rim 11. In such case, the lugs merely bite into the ground and procure the desired traction. If the said lugs are arranged as shown in Fig. 4, the teeth 44 thereof project appreciably beyond the periphery of the rim 11 and not only enter the ground, but serve to break up the ground as well. Such action assists in loosening the ground where the tractor is intended to operate a cultivator. Such action may be augmented by arranging the lugs with the blades thereof at an angle with respect to the radii of the wheel, depending upon the ground conditions and the speed of the tractor.

My invention is highly advantageous in that a simple and practical construction is provided whereby a single traction wheel and a single type of lug may be used for all ground conditions. The lug is adjustable angularly, as well as with reference to the depth of projection beyond the wheel proper, so that the same will function satisfactorily under all types of ground conditions. The lug may be reversed to provide extended supporting surface. By arranging the blades at the desired angle and causing the same to project appreciably outwardly beyond the rim of the wheel, the blades will function in the manner of the blades of a cultivator. With my invention, the blades, when worn, may be replaced, thus making it unnecessary to replace the lug holders. The lug holders are easily removed and easily adjusted and the lugs proper are easily mounted in the lug holders. The entire construction is rigid and substantial and will operate continuously with a minimum amount of attention.

Changes in the specific form of my invention, as herein described, may be made within the scope of what is claimed without departing from the spirit of my invention.

Having described my invention, what I claim as new and desire to protect by Letters Patent is:

1. In a traction wheel, a rim, a lug holder attached thereto, a lug having a blade formed with teeth, a shoe having a sole and spaced ears extending outwardly therefrom, said blade being received therebetween, means for securing said ears to said blade, and means for attaching the lug with either the teeth or the shoe in ground-engaging position.

2. In a traction wheel, a plate-like rim having an opening therein, the marginal portion of the rim about said opening being provided with a plurality of symmetrically arranged equally spaced irregularities, a lug holder comprising a head received within said opening and having irregularities corresponding with and engaging the irregularities of the rim to prevent rotation of the head and permitting of angular positioning of the head with reference to the rim, means on said head and engaging said rim on one side, means engaging said rim on the other side and attached to said head, spaced arms extending outwardly from said head, a plate-like lug received between said arms and adjustable radially relative to said head, and means for holding said lug in adjustable position.

3. In a traction wheel, a plate-like rim having an opening therein, the marginal portion of the rim about said opening being provided with a plurality of symmetrically arranged equally spaced irregularities, a lug holder comprising a head received within said opening and having irregularities corresponding with and engaging the irregularities of the rim to prevent rotation of the head and permitting of angular positioning of the head with reference to the rim, means on said head and engaging said rim on one side, means engaging said rim on the other side and attached to said head, spaced arms extending outwardly from said head, webs extending between said arms and head, a plate-like lug received between said arms, and bolts extending through said arms and lugs for attaching the lug to the arms.

4. In a traction wheel, a plate-like rim having a plurality of circumferentially arranged openings therein, the marginal portions of said rim at each of said openings being provided with a plurality of symmetrically arranged irregularities, a plurality of lug holders, heads formed on said lug holders, said heads being adapted to be received in said openings and irregularities on said heads corresponding to those of the rim at said openings and engaging the same to prevent rotation of the lugs, said irregularities of both the rim and lugs being equally spaced to permit of assembly of the lugs in various angular positions within said openings, means for holding said heads in said openings, guides formed on said lug holders, and a plurality of lugs each having a part slidable along one of said guides and means for holding said lugs attached to said holders.

NELS H. NELSON.